United States Patent [19]

Dennison, Jr. et al.

[11] Patent Number: 5,212,595
[45] Date of Patent: May 18, 1993

[54] STERILIZABLE FOCUSING LENS ASSEMBLY

[75] Inventors: Allan G. Dennison, Jr., Action, Mass.; Larry E. Shephard, Providence, R.I.

[73] Assignee: MP Video, Inc., Hopkinton, Mass.

[21] Appl. No.: 632,470

[22] Filed: Dec. 21, 1990

[51] Int. Cl.$^5$ ............................................. G02B 7/02
[52] U.S. Cl. .................................. 359/513; 359/808; 359/823
[58] Field of Search ................ 359/362, 367, 507–514, 359/600, 896, 819–826, 811–823; 128/4, 6

[56] References Cited

U.S. PATENT DOCUMENTS

| | | | |
|---|---|---|---|
| 2,818,768 | 1/1958 | Updegraff | 355/52 |
| 2,851,924 | 9/1958 | Beusker | 359/826 |
| 3,052,151 | 9/1962 | Clavé | 359/513 |
| 3,246,563 | 4/1966 | Quammen et al. | 359/513 |
| 3,740,114 | 6/1973 | Thompson | 359/513 |
| 3,832,727 | 8/1974 | Seiden | 354/187 |
| 4,030,113 | 6/1977 | Obreschkow | 354/286 |
| 4,168,897 | 9/1979 | Gates | 354/286 |
| 4,301,790 | 11/1981 | Bol et al. | 128/6 |
| 4,620,769 | 11/1986 | Tsuno | 385/118 |
| 4,718,730 | 1/1988 | Forkey | 359/513 |
| 4,779,613 | 10/1988 | Hashiguchi et al. | 128/6 |
| 5,056,903 | 10/1991 | Nakamura et al. | 359/513 |
| 5,124,838 | 6/1992 | Forkey et al. | 359/821 |

OTHER PUBLICATIONS

Bulletin No. BE488, Servometer Miniature Metal Bellows and Electroforms, Servometer Corporation, Cedar Grove, NJ.

Primary Examiner—Bruce Y. Arnold
Assistant Examiner—Thong Nguyen
Attorney, Agent, or Firm—Frost & Jacobs

[57] ABSTRACT

This is provided a sealed adjustable lens focusing assembly including a lens barrel having a substantially tubular body and oppositely spaced barrel ends. The barrel is preferably sealed adjacent its opposite ends by optical windows, and a focusing lens is reciprocably mounted within the barrel for selective adjustment along a predetermined longitudinal focal axis. A longitudinally reciprocable drive member is provided which extends inwardly into the tubular body of the lens barrel for selectively moving the lens along the focal axis. An expandable tubular sealing member having a longitudinally expandable tubular wall with oppositely disposed retainer ends is concentrically telescoped over the lens barrel. The retainer ends are preferably sealed in spaced relationship along the barrel, and the reciprocable drive member is connected to the focusing lens through the wall member intermediate the retainer ends. The sealing member provides an effective static seal about the lens barrel while permitting longitudinal adjustment of the focusing lens therewithin.

20 Claims, 3 Drawing Sheets

STERILIZABLE FOCUSING LENS ASSEMBLY

TECHNICAL FIELD

This invention relates to adjustable ocular assemblies for use in conjunction with optical equipment such as video cameras and the like, and, more particularly, to an improved leak-tight adjustable focusing assembly for use with camera and video equipment in applications where the assembly may be exposed to liquids, steam and extreme temperatures in order to be cleaned and/or sterilized between successive uses.

BACKGROUND ART

The use of endoscopic instruments and the adaption of video camera technology to endoscopic imaging has proven to be quite advantageous in a wide variety of surgical procedures and general diagnostic applications. Typically, an endoscopic instrument includes an elongated probe for use in penetrating and viewing remote and otherwise inaccessible body regions. Various endoscopic devices and surgical techniques have enabled the simplification of many surgical operations, and examples of commonly used endoscopic instruments include the laparascope, cystoscope, arthroscope, bronchoscope, and the colonoscope, whose names are obviously indicative of their functions and anatomical areas of use.

Conventional video endoscopic systems include an endoscope, an optical adapter and a video camera head. Before each use, the endoscopic system must be adequately cleaned and sterilized, such as by soaking or immersion in a sterilizing or disinfecting solution and/or sterilization by use of ethylene oxide gas. Conventional endoscopic devices require the surgeon to view the target area directly through the eyepiece of the endoscope, which typically necessitated the surgeon bending over or otherwise situating himself in awkward positions so as to be able to view through the eyepiece. Video camera technology has been adapted to overcome these kind of inconveniences and a typical assembly for adapting such camera technology to an endoscope includes an ocular assembly for focusing the visual image from the eyepiece for remote viewing, with such assembly including a mechanism for grasping the endoscopic eyepiece and coupling the same to the camera head. The coupling device generally has a fitting at its proximal end which attaches to the video camera or an adapter unit attached to the camera head. The distal end of the coupler comprises the mechanism for grasping the endoscopic eyepiece. Often the adapter unit includes adjustable viewing optics for the video camera to provide for focusing, zoom characteristics and the like.

To provide the adjustable viewing optics required for optimal performance and clarity in these endoscopic arrangements, the moving parts of the focusing optics are most preferrably sealed within a housing which protects the optics themselves from direct contact with the environment and with cleaning solutions and the high pressures often encountered in sterilization techniques. Heretofore, optical devices including the moving parts of focusing optics have been provided with a plurality of O-ring type seals which rotate or slide between various moving parts to provide a leak-tight seal. U.S. Pat. No. 4,779,613, which issued to T. Hashiguchi, et al. on Oct. 25, 1988, is an example of an endoscope which incorporates the use of a plurality of O-rings to allegedly provide an air-tight seal of its focusing lens. In particular, Hashiguchi, et al. contemplate the use of O-rings or silicon or epoxy based cement to prevent moisture from entering the optical system. It has been observed, however, that in order to obtain a good seal between adjacent parts utilizing O-ring type seals, a relatively high compression force must be maintained upon such seals.

In structures requiring a leak-tight seal between actual moving parts of an assembly, the required compression forces inherently increase the difficulty with which the pieces are moved relative to one another in use, and tend to break down the integrity of the O-rings in use. Moreover relative movement of the focusing optics is often accomplished by rotation of an adjustment knob which, in turn, moves one or more focusing lens along a focal axis. Consequently, in addition to longitudinal reciprocation, O-rings may also be subjected to relative rotational movement as well. Such constant wear and stress can compromise the integrity of even the most hermetic of seals over time, and may also require intricate and often time consuming maintenance and replacement programs. Any moisture which penetrates past the O-ring or cement seals during use and/or cleaning and sterilization procedures can make its way onto the focusing optics in use in the form of fogging or condensation, thereby interfering with the operator's view through the device.

Another approach to sealing a lens mounting system is set forth in U.S. Pat. No. 4,718,750, which issued to R. Forkey on Jan. 12, 1988. The Forkey lenses mounting system utilizes interacting threaded components to provide for axial adjustment of a lens mounting assembly, particularly depending upon lubrication between the threads to provide a fluid seal. The lubricating material is intended to serve both to lubricate the interacting threads of the rotatable members of the Forkey device and to provide the vapor fluid sealing function between the rotatable threaded members. In this arrangement, an external sleeve is pinned to a lens carrier held within the assembly for rotation relative to the centrally mounted body assembly. A second pin extends through the body assembly and into a helical groove formed in the lens carrier, so that relative rotation between the external sleeve and the body assembly causes the lens carrier to longitudinally reciprocate within the device.

While the Forky disclosure discusses a liquid tight seal against internal/external pressure differences, those pressures, heat and the caustic sterilization fluids generally utilized to clean and sterilize devices such as endoscopes used in surgical procedures, can quickly break down lubricants such as petroleum jelly and grease as contemplated in the Forky reference. Additionally, it is well known that repeated application of water and other fluids to grease and the like tends to break down these substances and could similarly compromise the fluid tight seal created thereby.

The axial adjustment of lens devices as a result of relative rotational movement between adjacent telescoping pieces has been widely used in the camera and lens industry. U.S. Pat. No. 2,818,768 (which issued to M. Updegraff on Jan. 7, 1958) and U.S. Pat. No. 4,030,113 (which issued to C. Obreschkow on Jun. 14, 1977) are examples of various camera and photographic equipment incorporating the use of relatively rotating parts to reciprocate a lens carrier focusing assembly. These structures, however, similarly fail to provide for adequate sealing of the reciprocating lens assembly to ensure a moisture and vapor proof seal for preventing condensation and/or fogging of the lens components in use.

An adjustable ocular mounting arrangement is also shown in U.S. Pat. No. 2,851,924, which issued to G. H. Beusker on Sep. 16, 1958. The Beusker disclosure acknowledges the problem in prior art sealing means which require a sliding seal between moving parts. As disclosed, the Beusker device includes a sleeve within which a plurality of lenses are hermetically sealed, with portions of the sleeve adapted to be longitudinally reciprocated in response to relative rotational movement between an adjusting ring and an ocular casing. In particular, the ocular casing is moved axially by relative rotation between the adjusting sleeve and such casing. The sleeve in which the lenses are secured is sealed within the casing by means of an expandable rubber bellows section. While this arrangement would appear to provide a liquid and air tight adjustable ocular arrangement which obviates a need for a sliding seal arrangement, its substantially closed construction and rubber bellows arrangement does not lend itself to facilitating cleaning procedures or to resisting the caustic cleaning solutions and high pressures and temperatures generally associated with repeated cleaning and sterilization procedures for surgical instruments and the like. Particularly, the rubber bellows would be subject to many of the same breakdown and maintenance problems discussed above with regard to O-ring type seals, and the Beusker device would require substantial disassembly to complete proper cleaning and sterilization procedures between uses.

Consequently, heretofore there has not been available in the industry a relatively simple, reliable, and durable leak-tight sterilizable adjustable optical assembly for use in endoscopic applications and similar optical setups where repeated cleaning and sterilization is necessary between uses, and wherein varying environments of moisture and high pressure are encountered. While various sealing arrangements have been provided in the industry from time to time, many require dynamic sealing arrangements and/or the use of sealing materials which are subject to degradation in relatively hostile environments of use, clean up and sterilization. Assemblies sealed with O-rings also generally require high compressive forces on the moveable seals, imposing deleterious forces on the rings and making adjustment movement more difficult. Additionally, the resulting structure of the adjustable focusing devices available heretofore have often required substantial disassembly for proper cleaning and sterilization between uses, requiring inconvenient and time consuming maintenance and replacement work. These devices have been unable to ensure the avoidance of fogging and/or condensation on the various focusing lens in use on an ongoing basis.

DISCLOSURE OF THE INVENTION

It is an object of this invention to obviate the above-described problems and shortcomings of the adjustable ocular devices and assemblies heretofore available in the industry.

It is another object of the present invention to provide an improved sealed adjustable lens focusing assembly which is relatively simple in structure, easy to use, and which facilitates cleaning and sterilization procedures between uses while insuring the prevention of fogging and condensation on the sealed lens therewithin.

It is yet another object of the present invention to provide a sealed adjustable lens focusing assembly for endoscopic applications and the like which includes an expandable tubular sealing member which provides an effective static seal of one or more focusing lenses reciprocably mounted within the assembly for adjustment along a predetermined focal axis.

It is also an object of the present invention to provide an adjustable lens focusing assembly featuring relatively open or skeletal overall structure to facilitate the application of cleaning fluids and the like to the device between uses, and the draining of cleaning or other fluids from the assembly following cleaning procedures and during use.

In accordance with one aspect of the present invention, there is provided a sealed adjustable lens focusing assembly including a lens barrel having a substantially tubular body and opposing barrel ends. The barrel is sealed adjacent its opposite ends by optical windows, and a focusing lens is reciprocably mounted within the barrel for selective adjustment along a predetermined longitudinal focal axis. A longitudinally reciprocable drive member is provided which extends inwardly into the tubular body of the lens barrel for selectively moving the lens along the focal axis. An expandable tubular sealing member having a longitudinally expandable tubular wall with oppositely disposed retainer ends is concentrically telescoped over the lens barrel. The retainer ends are preferably sealed in spaced relationship along the barrel, and the drive member is connected to the focusing lens via the wall member intermediate the retainer ends. The sealing member provides an effective static seal about the lens barrel while permitting longitudinal adjustment of the lens therewithin.

BRIEF DESCRIPTION OF THE DRAWINGS

While the specification concludes with claims particularly pointing out and distinctly claiming the present invention, it is believed that the same will be better understood from the following description taken in conjunction with the accompanying drawings in which:

DETAILED DESCRIPTION OF THE INVENTION

Figure 1:
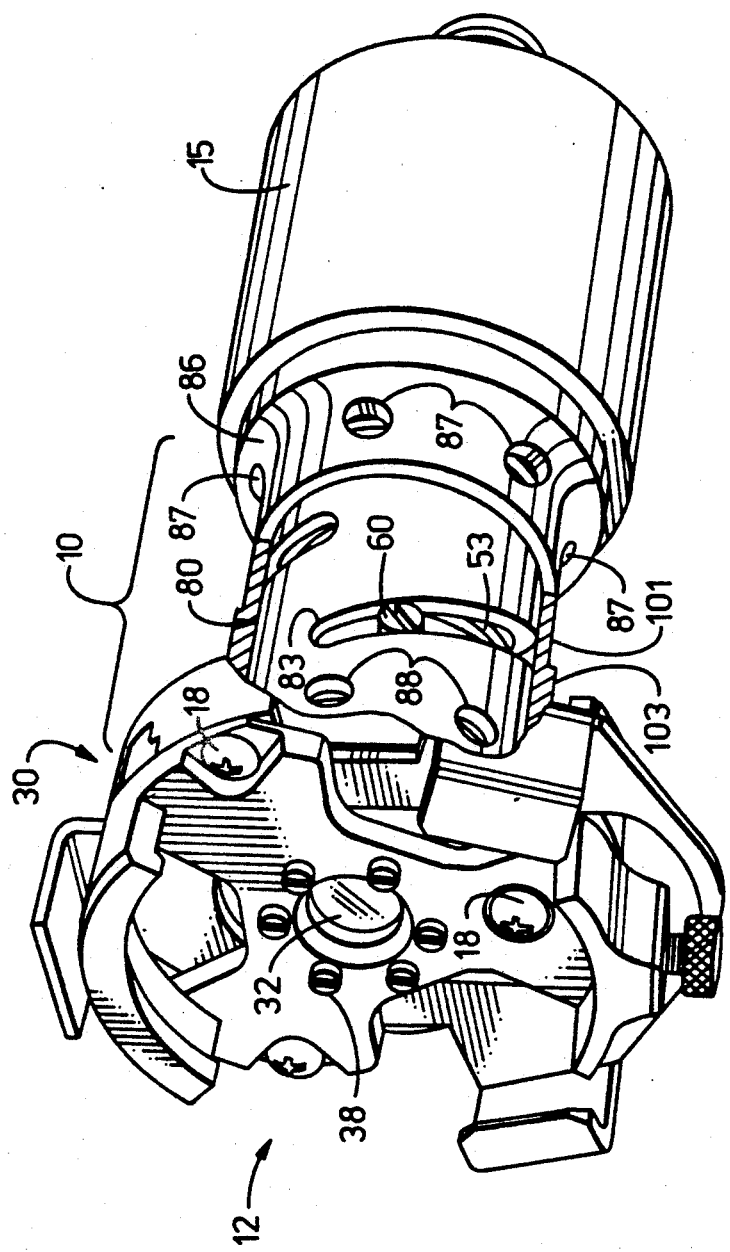
FIG. 1 is a partially broken away perspective view of a preferred embodiment of a sealed focusing lens assembly made in accordance with the present invention and shown attached to a camera head member.
Figure 2:
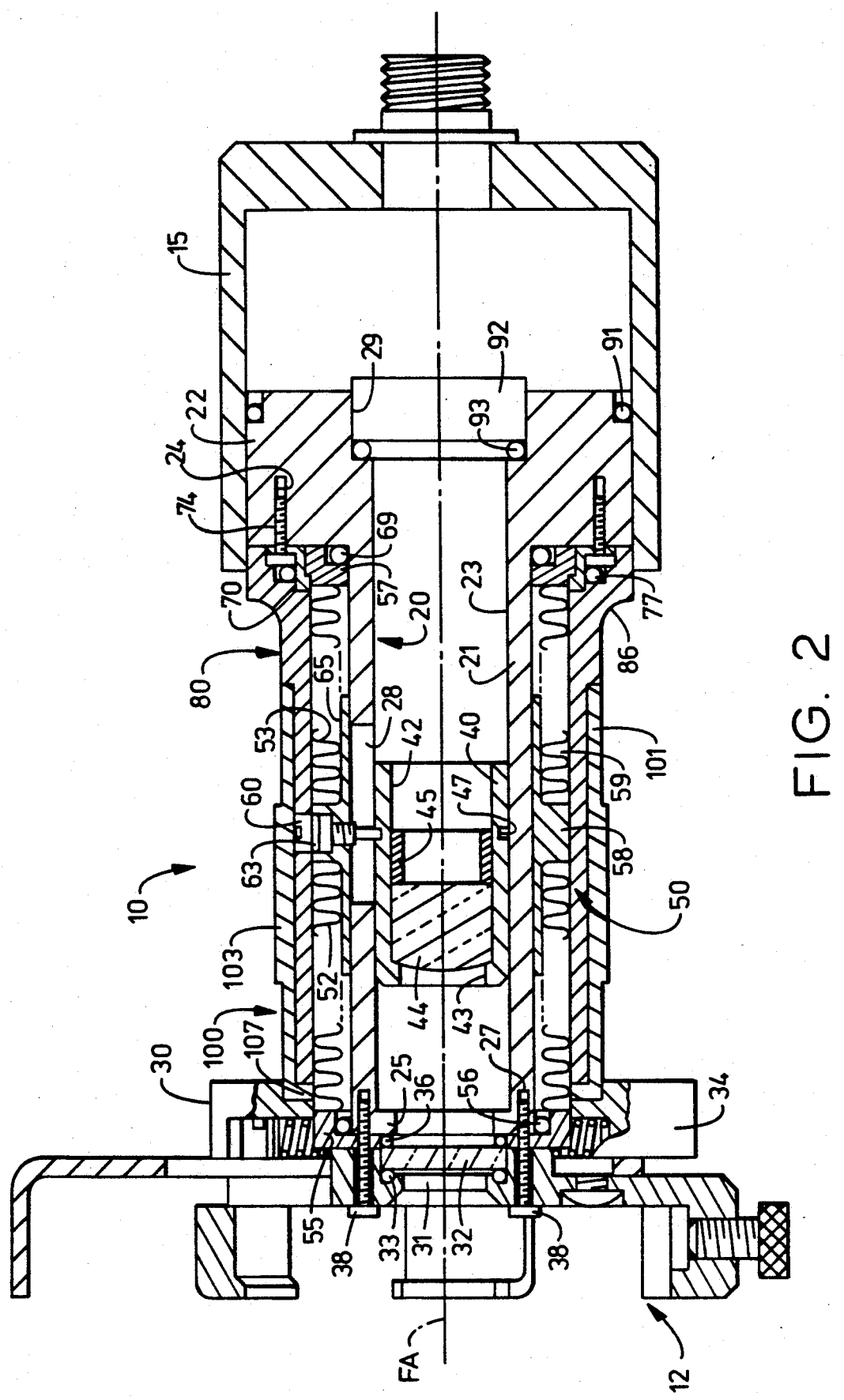
FIG. 2 is a vertical cross sectional view of the sealed lens focusing assembly of FIG. 1.
Figure 3:
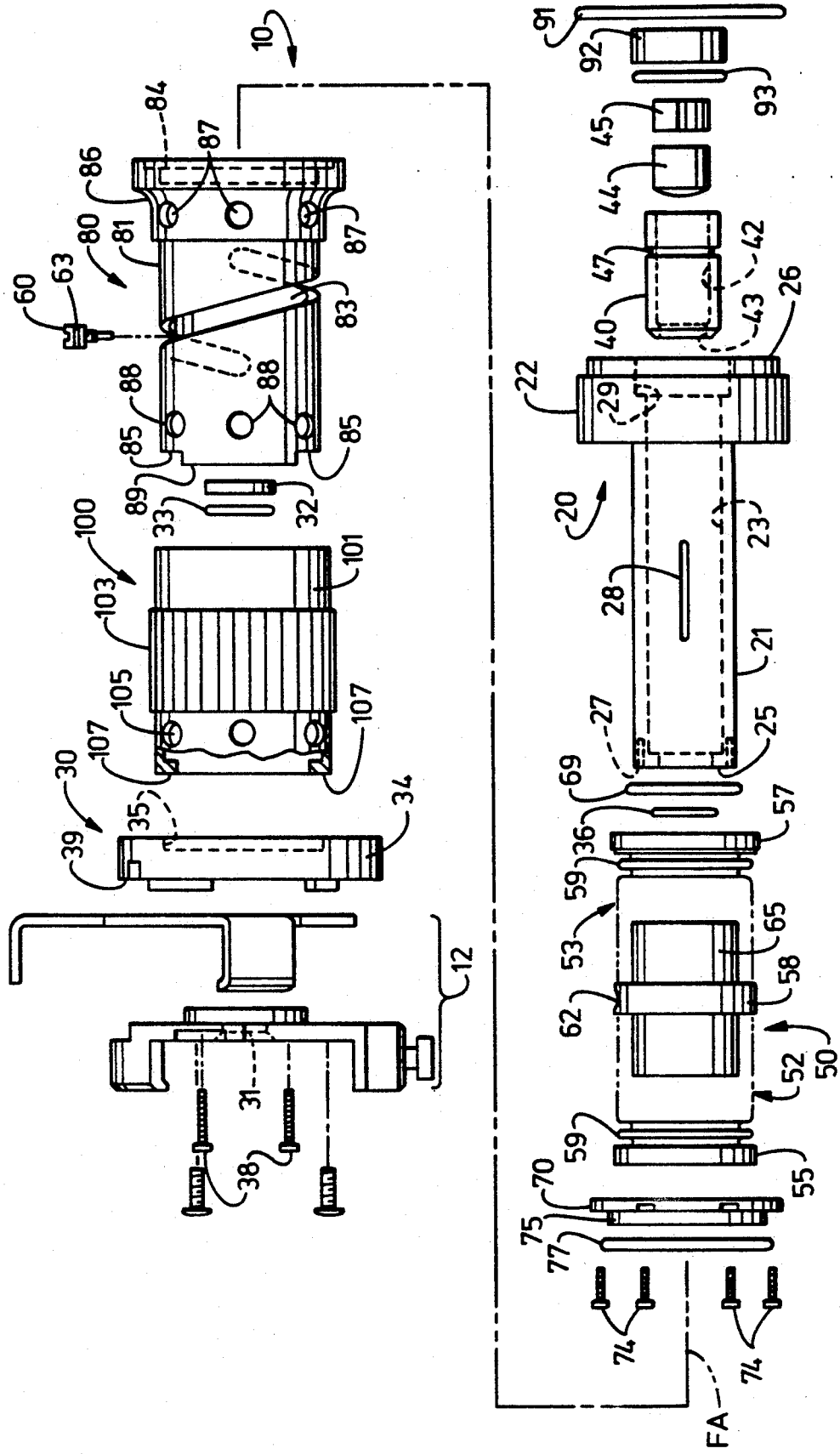
FIG. 3 is an exploded partially broken away side elevational and assembly view of the focusing lens assembly of FIG. 1.

Referring now to the drawings in detail, wherein like numerals indicate the same elements throughout the views, FIGS. 1-3 illustrate a preferred embodiment of a sealed focusing lens assembly made in accordance with the present invention. In particular, FIG. 1 is a perspective view of a lens focusing assembly 10 illustrated as it might be connected to a camera head apparatus 15 such as used in an endoscopic videocamera arrangement or the like. FIG. 2 illustrates a cross sectional view of the lens focusing assembly 10 of FIG. 1, as it might be attached to a camera head 15, while FIG. 3 illustrates an exploded elevational view of focusing assembly 10 itself.

As illustrated in FIGS. 1-3, in a preferred embodiment of the sealed adjustable lens focusing assembly of the present invention, at least one focusing lens 44 is mounted within a lens carrier 40 for reciprocable motion along a longitudinal focal or optical axis FA. Because lens carrier 40 will be reciprocated along axis FA, generally only a single focusing lens 44 is mounted therewithin. Lens carrier 40 is provided with an internal bore 42 so sized as to nicely receive lens 44, and may preferably include a suitable peripheral retainer ring or lip 43 for seating lens 44 therewithin without substantially impeding the line of vision along axis FA. Once lens 44 is mounted within lens carrier 40, a suitable retainer clip (e.g. 45) may be placed within lens carrier 40 to retain lens 44 in a desired position therewithin. The particular structural arrangement for mounting lens 44 within carrier 40 is not critical and can be accomplished in a variety of ways. As will be understood, a recessed groove 47 is also provided about at least a portion of the outer surface of lens carrier 40 to facilitate the longitudinal reciprocation of lens 44 along axis FA. Particularly, groove 47 accepts the distal end of a lens adjustment guide pin or drive member 60, which will be described in greater detail below.

Lens carrier 40 is designed to be received within a longitudinal throughbore 23 formed in lens barrel member 20. Lens barrel member 20 further comprises a substantially longitudinally extending lens barrel 21 attached at its proximal end to barrel flange 22, with both members including the common throughbore 23 as shown. Lens barrel 21 further includes a longitudinal slot 28 formed through its outer periphery substantially parallel to focal axis FA. Barrel flange 22 and lens barrel 21 can preferably be formed integrally as a single unit. A recess 29 is also preferably provided concentrically aligned along axis FA with through-bore 23 for mounting an optical window 92, which with an appropriate seal (e.g. O-ring 93) can be utilized to prevent dust from entering lens barrel member 20 once lens carrier 40 and its focusing lens 44 are mounted therewithin. In order to effectively seal the end of lens barrel member 20 mounted within camera head apparatus 15 in a fluid tight arrangement, a static O-ring seal is preferably provided at 91. Any convenient manner can be utilized to attach apparatus 15 to focusing assembly 10.

A circular attachment flange or lip 25 preferably extends radially inwardly from the periphery of lens barrel 21 adjacent its distal end to retain lens carrier 40 therewithin without substantially impeding the visual line of sight along axis FA. Flange 25 also preferably includes a plurality of tapped bores 27 for accepting a plurality of attachment means (e.g. screws 38) for connecting lens barrel 21 to a retainer member 30, as will be discussed below. O-ring 36 is used to provide a seal between flange 25 and retainer 30 when these parts are attached together.

An O-ring 69 is preferably provided and sized so as to slide over the exterior surface of lens barrel 21 to facilitate the provision of a static seal between lens barrel member 20 and the retainer end fitting or sealing ring 57 of the expandable tubular sealing member 50. Expandable tubular sealing member 50 preferably comprises a longitudinally expandable tubular wall member such as shown at 52 and 53 having oppositely disposed retainer end fittings or sealing rings 55 and 57, respectively.

The expandable tubular wall member of sealing member 50 preferably comprises an accordion-like or bellows type collapsable structure, most preferably formed of relatively resilient metallic material such as nickel, brass, bronze, stainless steel alloy, or a combination of these materials. Metal bellows are preferred as they can provide a precompressed expandable tubular sealing member 50 capable of withstanding high pressures and temperatures while maintaining a fluid-tight seal over lens barrel 21 and its enclosed lens carrier 40 and focusing lens 44 assembly. Left and right bellows members 52 and 53 are preferably provided as separate bellows sections attached at their adjacent portions to a hollow, ring-like lens mount 58 such as by soldering, brazing, welding or similar joining procedures. Expandable/collapsable metallic bellows structures can be obtained in the industry, such as from Servometer Corporation of Cedar Grove, N.J.

It is preferred that a multi-ply or laminated corrugated bellows structure (e.g. 52 and 53) be utilized for adjustable lens focusing assemblies contemplated for use in surgical applications where repeated high pressure and high temperature sterilization procedures will be required. Any appropriate combination of materials such as copper, brass, nickel, gold or the like can be utilized to provide an expandable tubular sealing member which is not brittle yet can survive in the relatively hostile environments to which surgical instruments are subjected.

Expandable tubular sealing member 50 is designed to fit over the exterior of lens barrel 21 as seen best in FIG. 2. Sealing ring 57 is connected about its circumference to one end of the right bellows member 53, and can be sealed, such as by means of O-ring 69, about its periphery to form an effective static seal with barrel flange 22. At the opposite end of sealing member 50, bellows member 52 is connected at its outer end to corresponding sealing ring/retainer end 55. As seen best in FIG. 2, retainer end 55 preferably comprises a generally inverted U-shaped configuration to at least partially enclose an O-ring 56 which facilitates the provision of an effective static seal of sealing member 50 adjacent the opposite end of lens barrel 21 as shown. As indicated, circular attachment flange 25 of lens barrel 21 can also provide a seat for O-ring 36 to help facilitate the sealing of the distal end of barrel 21 in a fluid tight manner.

The innermost edges of bellows members 52 and 53 are connected about their circumference to the ring-like lens mount 58 by any desired connection method such as soldering, brazing, welding or the like. Fitted substantially concentrically within tubular sealing member 50 to provide a sliding surface guide for lens mount 58 and at least a portion of sealing member 50 along the outer circumference of lens barrel 21 is a thin tubular sleeve 65. While sleeve 65 is optional, it is a preferred addition to improve alignment between reciprocating parts and increase reliability and longevity of the assembly. Lens carrier 40 is preferably attached to sleeve 65 and the circumscribing lens mount 58 via lens adjustment guide pin or drive member 60. As indicated in FIGS. 2 and 3, lens mount 58 and sleeve 65 may preferably be provided as an integral part, although this is not critical. As will be described below, drive member 60 will transmit axial movement from rotatable drum 80 to lens mount 58, guide sleeve 65 and the attached lens carrier 40.

As illustrated best in FIG. 2, the bellows members 52 and 53, respectively, comprise a plurality of adjacent folds or corrugations 59 which permit the longitudinal movement of lens mount 58 in a direction substantially parallel to focal axis FA. As will also be understood, the exact number and size of the individual corrugations 59 can vary between applications, as desired, with corrugations 59 defining an inner diameter of hollow sealing member 50 which is preferably designed to telescope over lens barrel 21 and guide sleeve 65 without substantial interference.

In a preferred embodiment, the means for reciprocating lens 44 along focal axis FA further comprises a rotatable drum 80 having a generally cylindrical body 81 telescoped over lens barrel 21 and expandable sealing member 50 for relative rotation therewith. A circular sealing flange 70 having an upstanding sealing rim 75 is preferably attached to barrel flange 22, such as via a plurality of screws 74 anchored in the tapped bores 24 of barrel flange 22. It is further contemplated that sealing flange 70 can facilitate the anchoring of retainer end 57 of tubular sealing member 50 adjacent barrel flange 22, as best illustrated in FIG. 2. Drum 80 can be formed with cylindrical recess 84 corresponding to flange 70 and receiving means such as O-ring 77 therebetween for providing a frictional dragging force to relative rotation between drum 80 and flange 70. While drum 80 is seated on sealing flange 70 and its rim 75, it need not be directly anchored thereto, as the front face 89 of drum 80 will preferably be longitudinally retained, such as by a corresponding recess 35 formed within retainer 30.

As illustrated in the figures, retainer 30 can comprise a substantially cylindrical disk-like main body 34 having a central apperture 31 formed therethrough. It is contemplated that an optical window or end cap 32 for providing a fluid tight seal adjacent the distal end of lens barrel 21 can be conveniently mounted within a recess (e.g. 35) of retainer 30, and window 32 may preferrably be sealed within retainer 30 such as by a compression seal or O-ring 33. As will be appreciated, once drum 80 is telescoped over the partially assembled lens focusing assembly 10, retainer 30 can be attached to the distal end or circular attachment flange 25 of lens barrel 21 such as via screws 38 and the corresponding tapped bores 27. It is contemplated that O-ring 36 can also be utilized to seal the connection between lens barrel 21 and retainer 30. As mentioned, it is further contemplated that recess 35 of retainer 30 can preferably be designed to rotatably receive front face 89 of drum 80, and to retain drum 80 in its rotatable, telescoped position about the periphery of lens barrel 21 and the concentric sealing member 50.

Drum 80 further comprises a helical slot 83 about its periphery and a plurality of cut-outs such as shown at 87 and 88. These cut-outs provide an overall general open or skeletal characteristic to drum 80, facilitating entry and drainage of disinfectant and other cleaning solutions, drainage of fluids which may be present during cleaning, surgical procedures or similar uses, and minimizing the overall weight of the lens focusing assembly of the present invention. Helical slot 83 is illustrated as a preferred means for providing longitudinal reciprocating motion along focal axis FA to a focusing lens (e.g. 44) sealed within the focusing assembly 10 as a result of rotation of drum 80.

Particularly, lens carrier 40 with its focusing lens 44 mounted therewithin can be inserted into lens barrel 21 through barrel flange 22 such that its recessed groove 47 is aligned with slot 28. A portion of helical slot 83 is similarly aligned with guide pin hole 62 and pin alignment hole 67, which in turn are aligned with slot 28 and recessed groove 47 for insertion of lens adjustment guide pin or drive member 60. In a preferred arrangement, drive member 60 comprises a pin having external threads along at least a portion of its length to interact with corresponding internal threads of guide pin hole 62. Drive member 60 is thereby screwed into place to retain its alignment function in use, with the lower portions of drive member 60 extending into recessed groove 47 without substantially binding lens carrier 40 within throughbore 23. An O-ring 63 may also be provided to ensure a fluid tight seal of drive member 60 in lens mount 58.

Once lens carrier 40 is aligned and attached to drive member 60, optical window or end cap 92 can be sealed in place within recess 29. By locating the upper portion or head of drive member 60 within helical slot 83, it can be understood that rotation of drum 80 will be converted into longitudinal movement of drive member 60 along slot 28, which in turn will reciprocate lens carrier 40 and its focusing lens 44 along focal axis FA.

Rotation sleeve 100 is preferably provided to telescope over drum 80 in order to facilitate tactile manipulation of drum 80 by a user. Particularly, rotation sleeve 100 is contemplated as comprising a tubular body 101 having a knurled portion 103 and a plurality of holes 105 corresponding in number, size and shape to cutouts 88 of drum 80. When telescoped over drum 80, sleeve 100 is interlocked for rotation with drum 80 by one or more locking tabs 107 which mate with corresponding slots 85 formed adjacent the end of drum 80, as best shown in FIG. 3. Accordingly, rotation of sleeve 100 imparts rotational force to drum 80. While a powered source of rotational energy could be attached to sleeve 100 in a variety of ways, it is believed that rotation of drum 80 can preferably be accomplished by manual manipulation by an operator.

FIGS. 1 and 2 illustrate adjustable lens focusing assembly 10 in its assembled condition. Because tubular sealing member 50 is effectively statically sealed at its oppositely disposed ends (i.e. at sealing rings 55 and 57, respectively), rotation of drum 80 will be relative to sealing member 50 and lens barrel 21. Longitudinal motion of reciprocable drive member 60 as a result of such relative rotation, will, in turn, move lens mount 58 and its underlying sleeve 65 in corresponding longitudinal movement along the outer periphery of lens barrel 21. The expandable bellows members 52 and 53 will alternately compress and expand via the individual corrugations 59 to accommodate for the movement of lens mount 58 therealong while maintaining a leak-tight seal about the periphery of lens barrel 21.

A sealing ring 63, O-ring, or similar sealing compound adequately resistant to high pressures, temperatures, and caustic cleaning fluids may also be preferrably utilized adjacent the guide pin hole 62 where drive member 60 is inserted through lens mount 58. Alternatively, drive member 60 may preferably be soldered or welded in place at lens mount 58 once it has been inserted through slot 28 and attached to lens carrier 40. As discussed, the utilization of tubular sleeve 65 within sealing member 50 is optional, and the longitudinal length of sleeve 65 should be designed so as not to interfere with the desired longitudinal stroke of lens 44 within lens barrel 21. Additionally, while a single bellows member could be substituted for the pair of bellows member 52 and 53, it is preferred to utilize a ring-like lens mount (e.g. 58) to provide a substantially reinforced connection point through which drive member 60 extends inwardly through sealing member 50.

An endoscopic eyepiece attachment mechanism such as generally illustrated at 12 may be attached adjacent distal face 39 of retainer 30 for aligning an endoscopic eyepiece with the adjustable lens focusing assembly of the present invention. Such attachment mechanism could be a quick-release assembly, as illustrated, or any of a variety of known coupling arrangements such as bayonet fittings, screw-on devices, or the like. As the manner and structure of any such attachment mechanism is in no way critical to the present invention, further details of such attachment structure will be omitted. Similarly, details of the camera head or adapter 15 which will be commonly attached adjacent the rear surface of barrel flange 22 has been shown only generically, as such structures are well known in the industry.

Other applications of the present invention are also contemplated. For example, if it were desired to include additional movable lenses or other optics within assembly 10 which could be moved independently of lens 44, it is contemplated that an additional drive member similar to drive member 60 could be provided in conjunction with the tubular sealing member as described above. Such an arrangement might be desired to provide zoom capabilities for the lens focusing assembly. Such additional movable lenses could be supported by a mounting assembly (e.g. similar to mount 58, sleeve 65 and carrier 40 described above), and such assembly might be located within the same tubular sealing member (i.e. at a location within bellows 52 or 53 spaced from carrier 40), or could be provided with its own tubular sealing member located along the lens barrel (e.g. an extended lens barrel 21). Any number of expandable tubular sealing members could be used in a lens assembly to provide for independent adjustability of a plurality of lenses or similar optics, although most applications should not require more than two. Each of such expandable tubular sealing members would be provided with the effective static seals described above, and adjacent sealing members may have a common static seal therebetween if desired.

Having shown and described the preferred embodiments of the present invention, further adaptions of the adjustable lens focusing assembly of the present invention can be accomplished by appropriate monifications by one of ordinary skill in the art without departing from the scope of the present invention. Several of these potential monifications have been mentioned or described, and others will be apparent to those of ordinary skill in the art. Accordingly, the scope of the present invention should be considered in terms of the following claims and is understood not to be limited to the details of structure in operation shown and described in the specification and drawings.

We claim:

1. A sealed adjustable focusing lens assembly, said assembly comprising:
   (a) a lens barrel having a substantially tubular body with a longitudinal throughbore therewithin and oppositely disposed barrel ends, said tubular body having fluid tight seals adjacent said barrel ends;
   (b) a focusing lens reciprocably mounted within said barrel for selective adjustment therewithin along a longitudinal optical axis;
   (c) means for reciprocating said lens along said axis within a portion of said barrel intermediate said barrel ends, said reciprocating means comprising a longitudinally reciprocable drive member which extends inwardly into said body for selectively moving said lens along said axis; and
   (d) an expandable tubular sealing member concentrically telescoped over said barrel, said sealing member comprising a longitudinally expandable tubular wall member having longitudinally spaced oppositely disposed retainer ends, said retainer ends sealingly attached relative to said barrel, wherein said drive member is connected to said focusing lens through said tubular sealing member intermediate said retainer ends, and whereby said sealing member provides an effective static seal about said portion of said barrel while permitting longitudinal adjustment of said lens therewithin.

2. The adjustable focusing lens assembly of claim 1, further comprising a lens carrier mounted within said lens barrel for supporting said lens for reciprocation therewithin, and wherein said drive member is connected to said carrier.

3. The adjustable focusing lens assembly of claim 1, wherein said expandable tubular wall member is formed of metallic material.

4. A sealed, adjustable focusing lens assembly capable of withstanding repeated high temperature and high pressure sterilization, said assembly comprising:
   (a) a lens barrel having a substantially tubular body extending along a longitudinal axis, oppositely disposed barrel ends, and a fluid tight seal adjacent each of said barrel ends;
   (b) a focusing lens reciprocably mounted within said lens barrel intermediate said barrel ends for selective adjustment therewithin along an optical axis substantially parallel to said longitudinal axis;
   (c) means for reciprocating said lens along said optical axis, said reciprocating means comprising a reciprocable drive member extending inwardly through an opening in said lens barrel and connected to said focusing lens; and
   (d) a tubular sealing member concentrically telescoped over said barrel and having a pair of spaced retainer ends attached in fluid tight arrangement adjacent said barrel to sealingly enclose said opening therewithin, said reciprocating means extending through said sealing member, and said sealing member comprising an expandable tubular wall portion to accommodate reciprocating movement of said drive member in a direction parallel with said optical axis while maintaining an effective static seal about said barrel.

5. The adjustable focusing lens assembly of claim 4, wherein said means for reciprocating said lens further comprises a tubular sleeve telescoped over said lens barrel to provide support for said drive member, said sleeve being mounted within said tubular sealing member for longitudinal reciprocation along said lens barrel.

6. A sealed adjustable focusing lens assembly capable of being repeatedly sterilized in high temperatures, high pressures, and sterilizing fluid, said assembly comprising:
   (a) a lens barrel having a substantially tubular body with oppositely disposed ends, said tubular body being sealed adjacent said ends in a fluid tight arrangement;
   (b) a focusing lens reciprocably mounted within said lens barrel intermediate said barrel ends for selective adjustment therewithin along an optical axis;
   (c) means for reciprocating said lens along said axis, said reciprocating means comprising a reciprocable drive member extending inwardly through a longitudinal slot in said lens barrel and connected to said focusing lens; and (d) a tubular sealing member concentrically telescoped over said barrel and having a pair of spaced retainer ends attached adjacent said barrel to sealingly enclose said slot therewithin in fluid tight relation, said reciprocating means extending through said sealing member, and said sealing member comprising an expandable tubular wall portion having a plurality of adjacent corrugations forming a bellows-like portion to accommodate reciprocating movement of said drive member in a direction parallel with said axis while maintaining an effective static seal about said barrel.

7. A sealed focusing lens assembly, said assembly comprising:

(a) a lens barrel having a substantially tubular body and opposite barrel ends;

(b) a focusing lens reciprocably mounted within said barrel for selective adjustment therewithin along an optical axis;

(c) means for reciprocating said lens along said axis within a portion of said barrel intermediate said barrel ends, said reciprocating means comprising a longitudinally reciprocable drive member which extends inwardly into said body for selectively moving said lens along said axis; and (d) an expandable tubular sealing member concentrically telescoped over said barrel, said sealing member comprising a longitudinally expandable tubular wall member having oppositely disposed retainer ends, a pair of longitudinally expandable tubular wall members having a plurality of adjacent circumferential corrugations providing a pair of bellows-like expandable portions to permit said longitudinal adjustment of said lens within said barrel, and a slidable ring member attached intermediate said oppositely disposed retainer ends and between said pair of bellows-like expandable portions, and said retainer ends capable of being sealingly attached in spaced relation adjacent said barrel, wherein said drive member is connected to said focusing lens through said tubular sealing member intermediate said retainer ends, and whereby said sealing member provides an effective static seal about said portion of said barrel while permitting longitudinal adjustment of said lens therewithin.

8. A sealed focusing lens assembly, said assembly comprising:

(a) a lens barrel having a substantially tubular body and opposite barrel ends;

(b) a focusing lens reciprocably mounted within said barrel for selective adjustment therewithin along a longitudinal optical axis;

(c) means for reciprocating said lens along said axis within a portion of said barrel intermediate said barrel ends, said reciprocating means comprising a longitudinally reciprocable drive member which extends inwardly into said body for selectively moving said lens along said axis;

(d) an expandable tubular sealing member concentrically telescoped over said barrel, said sealing member comprising a longitudinally expandable tubular wall member having oppositely disposed retainer ends, said retainer ends capable of being sealingly attached in spaced relation adjacent said barrel, wherein said drive member is connected to said focusing lens through said tubular sealing member intermediate said retainer ends, and whereby said sealing member maintains a static seal about said portion of said barrel while permitting longitudinal adjustment of said lens therewithin; and (e) a drum member telescoped over said sealing member and being rotatable relative said lens barrel, whereby rotation of said drum imparts longitudinal movement to said drive member along said axis.

9. The adjustable focusing lens assembly of claim 8, wherein said drum member comprises a helical groove, and wherein said drive member comprises a guide pin which interacts with said helical groove and extends through a longitudinal slot in said lens barrel, whereby rotation of said drum causes longitudinal reciprocation of said guide pin along said slot to reciprocate said lens along the optical axis.

10. The adjustable focusing lens assembly of claim 9, wherein said guide pin comprises a threaded member having a head and extending through said tubular sealing member and said slot and connected to said lens, said head located within said helical groove.

11. A sealed, adjustable focusing lens assembly capable of withstanding repeated high temperature and high pressure sterilization, said assembly comprising:

(a) a lens barrel having a substantially tubular body extending along a longitudinal axis and oppositely disposed sealed barrel ends;

(b) a focusing lens reciprocably mounted within said lens barrel intermediate said barrel ends for selective adjustment therewithin along an optical axis substantially parallel to said longitudinal axis;

(c) means for reciprocating said lens along said optical axis, said reciprocating means comprising a reciprocable drive member extending inwardly through an opening in said lens barrel and connected to said focusing lens; and (d) a tubular sealing member concentrically telescoped over said barrel and having a pair of spaced retainer ends capable of being attached adjacent said barrel to sealingly enclose said opening therewithin, and a slidable ring member attached to said drive member, said reciprocating means extending through said sealing member, and said sealing member comprising an expandable tubular wall portion to accommodate reciprocating movement of said drive member in a direction parallel with said optical axis while maintaining an effective static seal about said barrel.

12. A sealed, adjustable focusing lens assembly capable of withstanding repeated high temperature and high pressure sterilization, said assembly comprising:

(a) a lens barrel having a substantially tubular body extending along a longitudinal axis, an opening formed in said body, and oppositely disposed sealed barrel ends;

(b) a focusing lens reciprocably mounted within said lens barrel intermediate said barrel ends for selective adjustment therewithin along an optical axis substantially parallel to said longitudinal axis;

(c) a tubular sealing member concentrically telescoped over said barrel and having a pair of spaced retainer ends capable of being attached adjacent said barrel to sealingly enclose said opening therewithin; and (d) means for reciprocating said lens along said focal axis, said reciprocating means comprising a reciprocable drive member extending inwardly through said opening in said lens barrel and connected to said focusing lens, and a substantially hollow drum member telescoped over said sealing member and rotatable relative said lens barrel, whereby rotation of said drum imparts longitudinal movement to said drive member along said focal axis, said reciprocating means extending through said sealing member, and said sealing member comprising an expandable tubular wall portion to accommodate reciprocating movement of said drive member in a direction parallel with said optical axis while maintaining an effective static seal about said barrel.

13. The adjustable focusing lens assembly of claim 12, wherein said drum member further comprises a helical groove, and wherein said opening in said lens barrel comprises a longitudinal slot, and said drive member comprises a guide pin extending through said slot, whereby rotation of said drum relative said lens barrel causes longitudinal reciprocation of said guide pin along said slot for reciprocating said lens along said optical axis.

14. The adjustable focusing lens assembly of claim 13, wherein said guide pin comprises a threaded member having a head and extending through said tubular sealing member and said slot and being attached to said lens, said head located within said helical groove.

15. The adjustable focusing lens assembly of claim 14, further comprising a lens carrier mounted within said lens barrel for supporting said lens for reciprocation along said optical axis, wherein said threaded member is connected to said lens carrier.

16. A sealed, adjustable focusing lens assembly capable of withstanding repeated high temperature and high pressure sterilization, said assembly comprising:
   (a) a lens barrel having a substantially tubular body extending along a longitudinal axis and oppositely disposed sealed barrel ends, wherein at least one of said oppositely disposed barrel ends is effectively sealed by an optical window mounted adjacent said at least one barrel end;
   (b) a focusing lens reciprocably mounted within said lens barrel intermediate said barrel ends for selective adjustment therewithin along an optical axis substantially parallel to said longitudinal axis;
   (c) means for reciprocating said lens along said optical axis, said reciprocating means comprising a reciprocable drive member extending inwardly through an opening in said lens barrel and connected to said focusing lens; and
   (d) a tubular sealing member concentrically telescoped over said barrel and having a pair of spaced retainer ends capable of being attached adjacent said barrel to sealingly enclose said opening therewithin, said reciprocating means extending through said sealing member, and said sealing member comprising an expandable tubular wall portion to accommodate reciprocating movement of said drive member in a direction substantially parallel with said optical axis while maintaining an effective static seal about said barrel.

17. A sealed, adjustable focusing lens assembly, said assembly comprising:
   (a) a lens barrel having a substantially tubular body with a longitudinal throughbore therewithin and oppositely disposed barrel ends, said tubular body having fluid tight seals adjacent said barrel ends;
   (b) a focusing lens reciprocably mounted within said barrel for selective adjustment therewithin along a longitudinal optical axis;
   (c) means for reciprocating said lens along said axis within a portion of said barrel intermediate said barrel ends, said reciprocating means comprising a longitudinally reciprocable drive member which extends inwardly into said body for selectively moving said lens along said axis; and
   (d) an expandable tubular sealing member concentrically telescoped over said barrel, said sealing member comprising a longitudinally expandable tubular wall member having longitudinally spaced oppositely disposed retainer ends and a plurality of corrugations forming a bellows-like portion which can be expanded and compressed in a direction parallel to said optical axis, said retainer ends sealingly attached relative to said barrel, wherein said drive member is connected to said focusing lens through said tubular sealing member intermediate said retainer ends, and whereby said sealing member provides an effective static seal about said portion of said barrel while permitting longitudinal adjustment of said lens therewithin.

18. The adjustable focusing lens assembly of claim 17, further comprising a pair of longitudinally expandable tubular wall member having a plurality of adjacent circumferential corrugations providing a pair of bellow-like expandable portions to permit said longitudinal adjustment of said lens within said barrel.

19. A sealed, adjustable focusing lens assembly capable of withstanding repeated high temperature and high pressure sterilization, said assembly comprising:
   (a) a lens barrel having a substantially tubular body extending along a longitudinal axis and oppositely disposed sealed barrel ends;
   (b) a focusing lens reciprocably mounted within said lens barrel intermediate said barrel ends for selective adjustment therewithin along an optical axis substantially parallel to said longitudinal axis;
   (c) means for reciprocating said lens along said optical axis, said reciprocating means comprising a reciprocable drive member extending inwardly through an opening said lens barrel and connected to said focusing lens; and
   (d) a tubular sealing member concentrically telescoped over said barrel and having a pair of spaced retainer ends capable of being attached adjacent said barrel to sealingly enclose said opening therewithin, and a slidable ring member attached to said drive member, said reciprocating means extending through said sealing member, and said sealing member comprising a pair of expandable tubular wall portions each having an inner end attached to said ring member and an outer end forming a portion of said retainer ends, said expandable wall portions accommodating reciprocating movement of said drive member in a direction parallel with said optical axis while maintaining an effective static seal about said barrel.

20. The adjustable focusing lens assembly of claim 19, wherein said expandable tubular wall portions further comprise a plurality of corrugated circumferential folds to provide bellows-like expandability and compressability to said tubular wall portions.

* * * * *

UNITED STATES PATENT AND TRADEMARK OFFICE
CERTIFICATE OF CORRECTION

PATENT NO. : 5,212,595
DATED : May 18, 1993
INVENTOR(S) : Allan G. Dennison, Jr. & Larry E. Shepherd It is certified that error appears in the above—identified patent and that said Letters Patent is hereby corrected as shown below:

In column 10, claim 6, line 57, "/or" should be inserted after --and--

In column 14, claim 19, line 44, "in" should be inserted before --said lens barrel--

On the title page,
In [56] References Cited, "4,718,730" should be deleted and replaced with --4,718,750

Signed and Sealed this

Twenty-second Day of March, 1994

Attest:

BRUCE LEHMAN

Attesting Officer      Commissioner of Patents and Trademarks